Oct. 22, 1957 — A. U. BRYANT — 2,810,542
VALVE CONSTRUCTION
Filed Feb. 11, 1952 — 4 Sheets-Sheet 1
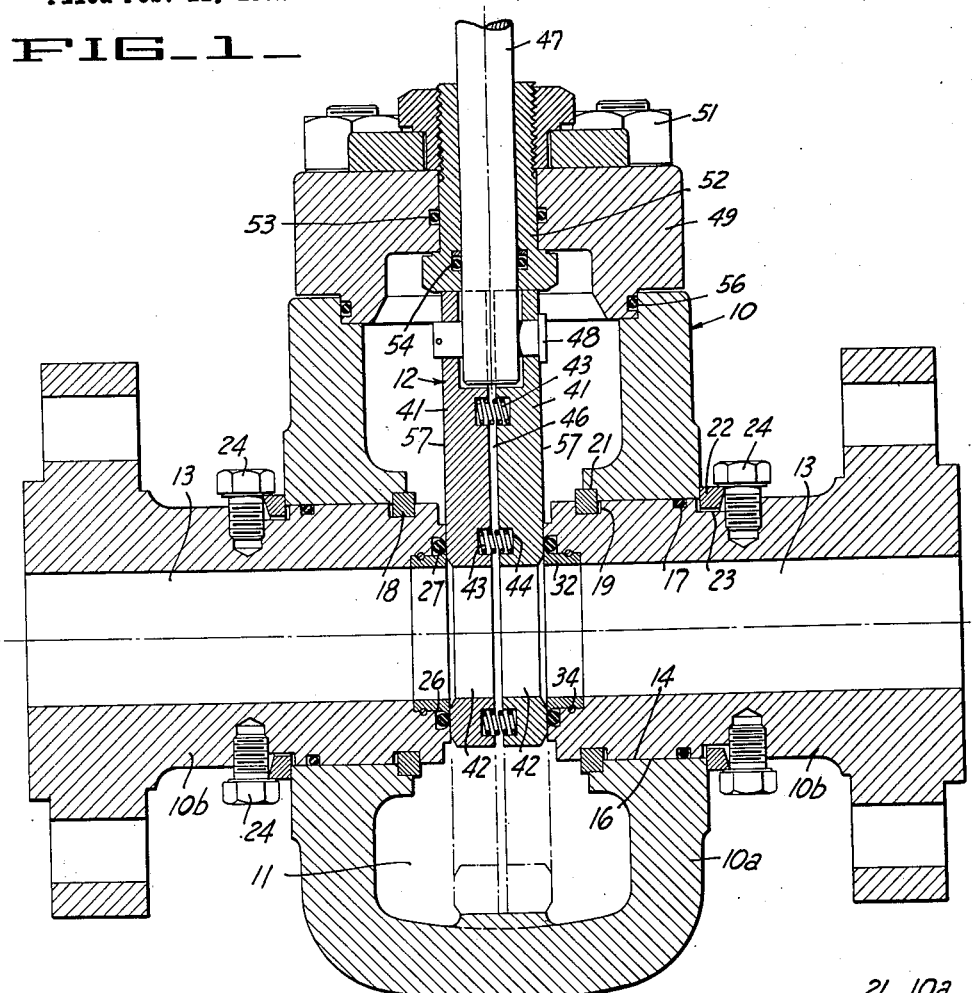
FIG_1_
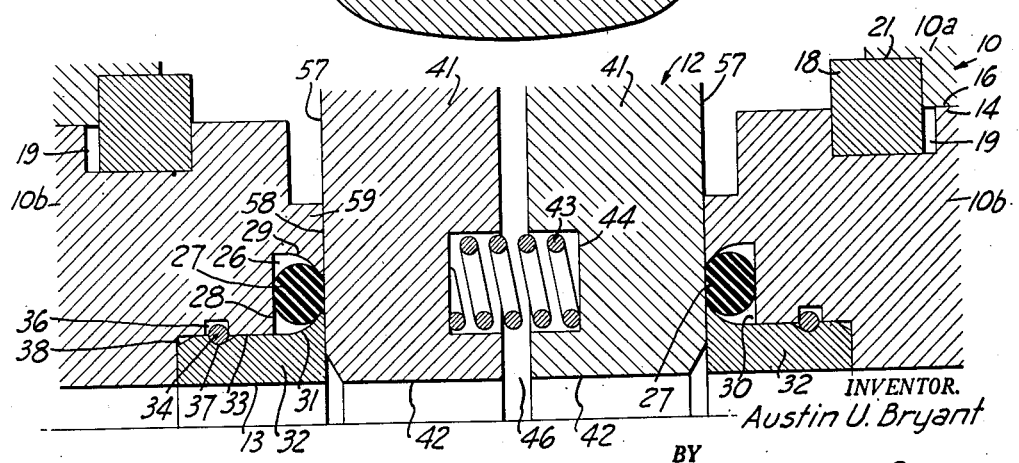
FIG_2_
INVENTOR.
Austin U. Bryant
BY
ATTORNEYS

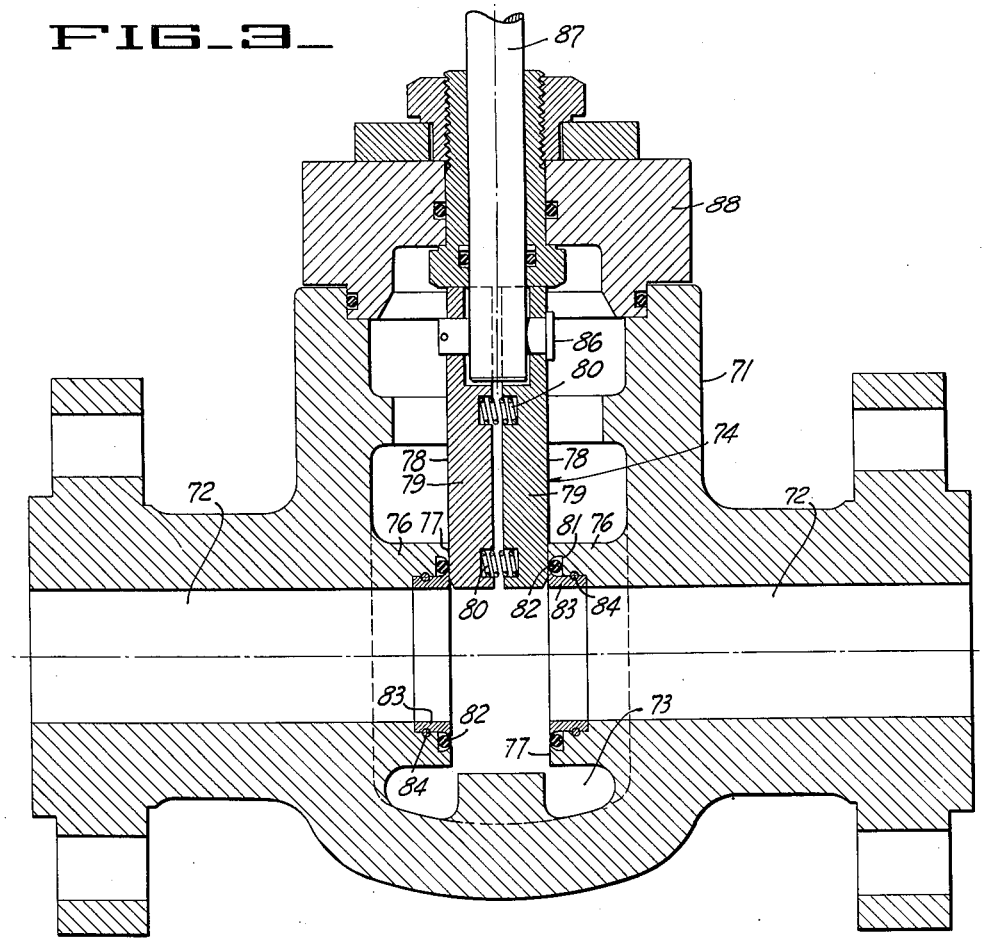
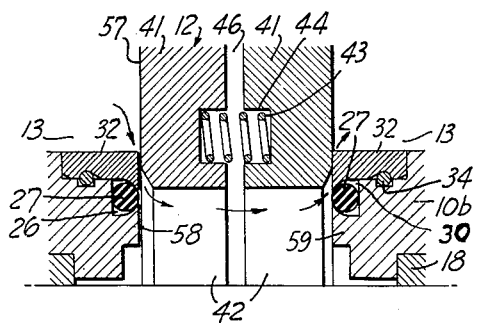
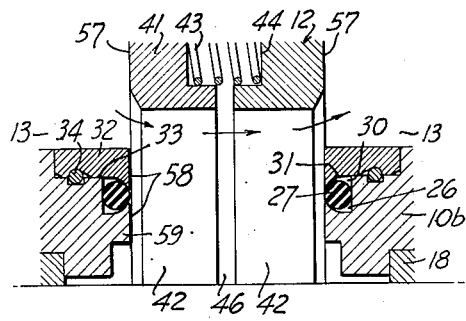

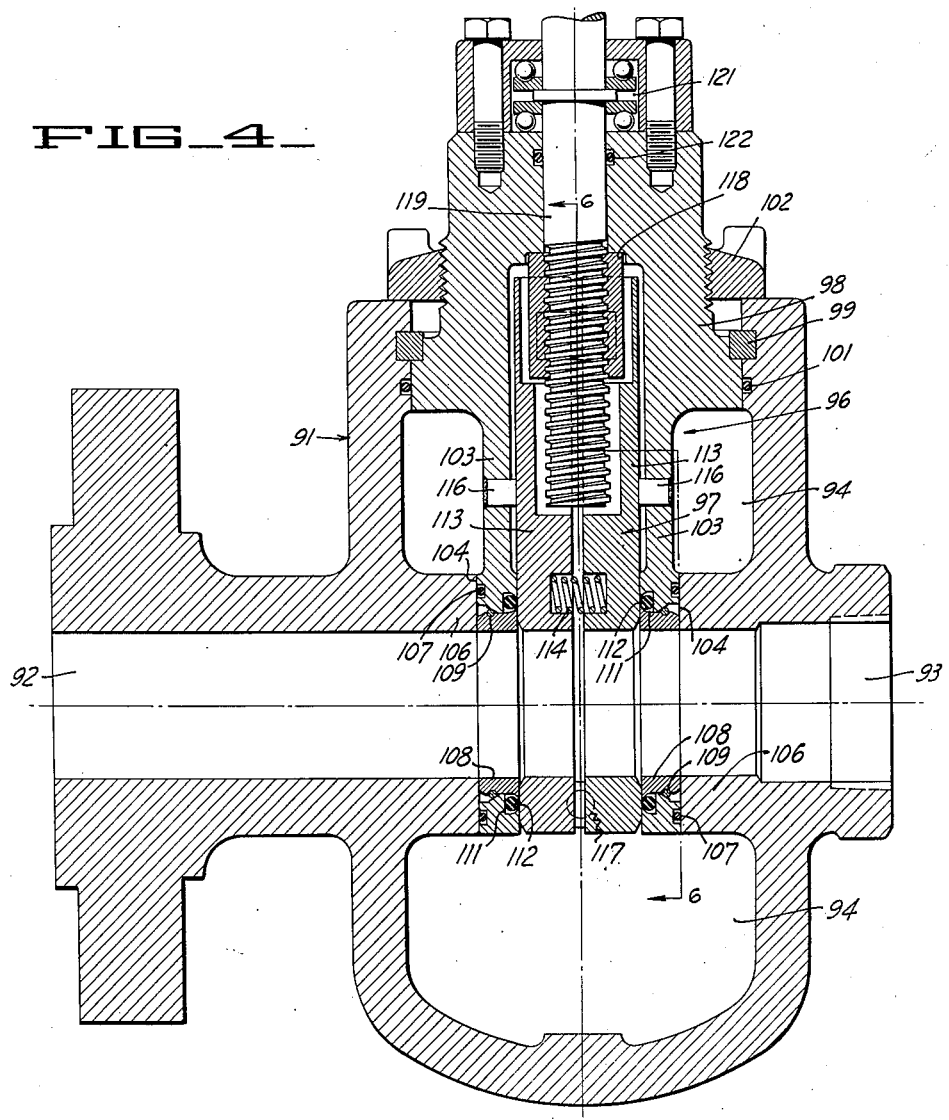
FIG_4_
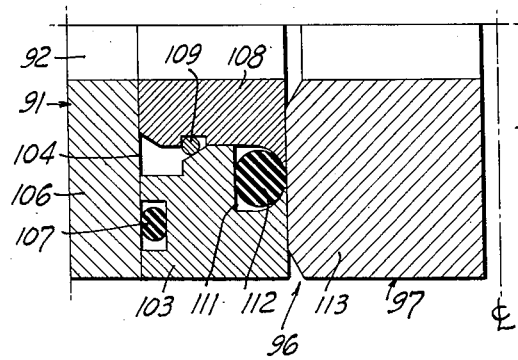
FIG_5_
INVENTOR.
Austin U. Bryant
BY
ATTORNEYS

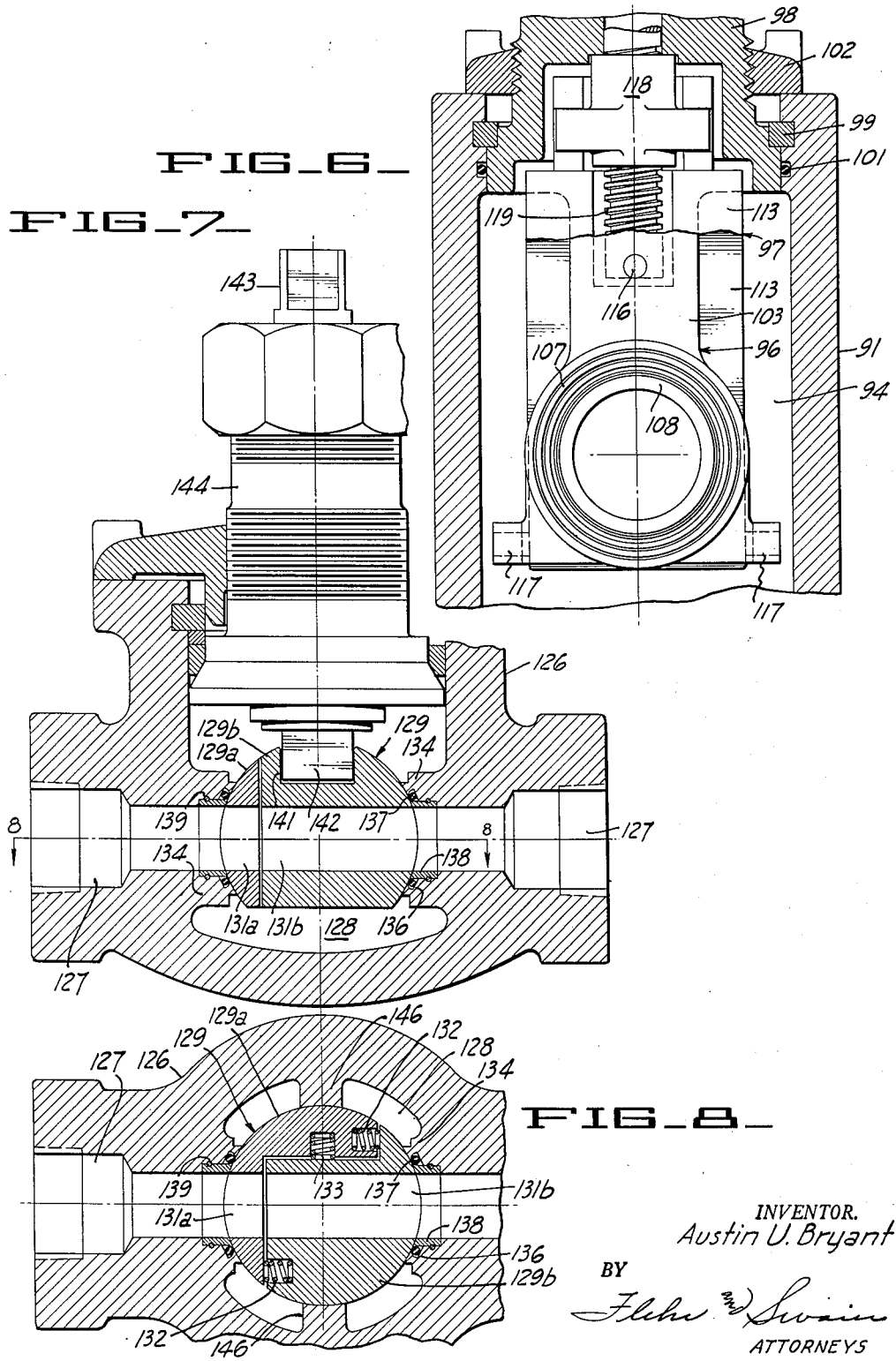

United States Patent Office 2,810,542
Patented Oct. 22, 1957

2,810,542

VALVE CONSTRUCTION

Austin U. Bryant, Berkeley, Calif., assignor, by mesne assignments, to Walworth Company, New York, N. Y., a corporation of Massachusetts Application February 11, 1952, Serial No. 271,037

4 Claims. (Cl. 251—172)

This invention relates generally to valves of the type used for controlling flow of various fluids, including gases and liquids.

In the past fluid flow control valves have been provided with one or more resilient seal rings of the O ring type, to provide a fluid tight seal when the valve member is in closed position. Such a valve is disclosed in Bryant application Serial No. 3,728, filed January 22, 1948, now Patent No. 2,713,989, granted July 26, 1955, and entitled "Valve Construction." As described in said Bryant application, when such valves are applied to relatively high fluid pressures, as for example pressures of the order of 1000 p. s. i. or more, a special construction must be used to prevent dislodgment of the resilient seal ring when the valve is moved from closed to open position. Special problems are involved when it is attempted to apply sealing means of the O ring type to certain kinds of valves, as for example gate and plug valves. It is desirable with such valves to provide for sealing against pressure applied to either side, and this complicates the problem of preventing dislodgment of one or more seal rings when the valve is moved between closed and open positions.

An object of the present invention is to provide a valve construction making use of one or more seal rings of the O ring type, which is applicable to two-way service, or in other words may be opened and closed with fluid pressure applied to either side of the same.

Another object of the invention is to provide novel features particularly applicable to valves of the gate or rotary plug type.

A further object of the invention is to provide a novel valve construction which serves to simplify the manufacture of valves of the gate or plug type, and which facilitates access to the means employed for retaining the resilient seal rings.

Additional objects of the invention will appear from the following description in which the preferred embodiments of the invention have been set forth in detail in conjunction with the accompanying drawing.

Referring to the drawing:

Figure 1 is a side elevational view in section illustrating a valve of the gate type incorporating the present invention.

Figure 2 is an enlarged cross-sectional detail showing the resilient O rings, and the mounting means employed for the same.

Figures 2A and 2B are views like Figure 2 but showing the movable valve member in different operating positions.

Figure 3 is a side-elevational view in section like Figure 1, but showing another embodiment of the invention.

Figure 4 is a side elevational view in section like Figure 1 but showing another embodiment of the invention.

Figure 5 is an enlarged cross-sectional detail illustrating the mounting means for the O rings used in the embodiment of Figure 4.

Figure 6 is a cross-sectional view taken along the line 6—6 of Figure 4.

Figure 7 is a side elevational view in section illustrating another embodiment of the invention.

Figure 8 is a cross-sectional view taken along the line 8—8 of Figure 7.

The gate valve illustrated in Figure 1 consists of a body 10 that is formed in several parts. The main body part 10a forms the space 11 for receiving the movable valve member or gate 12. The sleeve-like body parts 10b are fitted into and retained within the main body part, in a manner presently to be described, and provide the flow passages 13. The inner end of each body part 10b carries means serving to provide sealing engagement with the adjacent working surfaces of the gate 12.

The body parts 10b can be duplicates as illustrated, and this likewise applies to the elements assembled upon the same. Each of these body parts is provided with a machined cylindrical surface 14, which is adapted to slidably fit within the corresponding bore 16 of the main body part. Suitable means such as the resilient O ring 17 provides a fluid tight seal. As suitable means for holding each body part 10b in fixed position within the main part of the body, I provide a split or segmented metal lock ring 18, which is accommodated in an annular groove 19. The body adjacent each ring 18 is provided with an annular recess 21, within which the lock ring is normally accommodated to prevent its dislodgment from the groove 19. Another split metal ring 22 is removably disposed within an annular groove 23. Screws 24 engage and hold the ring 22 in place. Both of the lock rings 18 and 22 serve to hold the corresponding body part 10b against axial displacement. By removing screws 24, followed by removal of the ring 22, the body part 10b can be slid inwardly to permit disengagement of the ring 18. Thereafter the body part 10b can be retracted.

The inner end portion of each body part 10b has its end face interrupted by the annular groove 26, which serves to accommodate the resilient seal ring 27. The groove 26 is defined by the substantially flat bottom surface 28, and the outer and inner side retaining surfaces 29 and 31. The surfaces 29 and 31, as viewed in section (Figure 2) preferably are curved or arcuate for a purpose to be presently explained.

Instead of forming the surface 31 on a portion which is integral with the body part 10b, it is formed upon a separate metal ring or sleeve 32. The sleeve 32 is fitted within a counter bore 33 provided in the body part 10b, and is locked in fixed position with respect to body part 10b by suitable means such as the metal snap-in ring 34. This ring 34 normally has its outer portion accommodated in the groove 36, and its inner portion accommodated in a groove 37 formed in the periphery of the sleeve 32. During assembly sleeve 32 can be thrust into place after the snap-in ring 34 has been loosely accommodated in the groove 36. The outer corner 38 of the sleeve is beveled whereby as the sleeve 32 is thrust into place it expands the ring 34 by camming action, after which the ring 34 snaps into the groove 37.

The fit between each sleeve 32 and its corresponding counter bore provides in effect a duct which communicates between the adjacent passage 13 and the corner 30 of the corresponding groove 26.

The resilient seal ring 27 is of the resilient O ring type, and can be made of suitable resilient material such as synthetic rubber.

The gate 12 is formed in two parts or sections 41. As illustrated in Figure 1, each section is in the form of a substantially flat metal plate, with the plates having port openings 42 that are adapted to align with the passages 13 for open position of the valve. The sections are yieldably urged apart into engagement with the inner end of the body parts 10b, by the compression springs 43. The springs are seated within openings 44 provided in the inner faces of the sections 41, and are normally under compression. There is a small clearance 46 between the gate sections 41, whereby the sections may move toward each other a limited distance. Suitable means (not shown) can slidably engage the edges of the gate sections to generally retain the gate centrally located within the body.

The upper ends of the gate sections 41 are loosely attached together and to the valve operating stem 47, by the pin 48. The stem extends through the body cover or bonnet 49, which is held in place by suitable means such as the bolts or screws 51. Suitable sealing means prevents leakage between the bonnet and the stem. Thus the bonnet is fitted with a metal bushing 52, which is sealed with respect to the bonnet and the stem 49 by suitable means such as the resilient O rings 53 and 54. The bonnet in turn is sealed with respect to the main body part by suitable means such as the resilient O ring 56.

The two sections of the gate 12 are machined to provide the parallel side surfaces 57. Rings 32 can be machined to provide end faces which are coincident with the end faces 58 or portions 59, but preferably the dimensioning of rings 32 is such that their end faces extend slightly beyond the faces of portions 59, as for example a few thousandths of an inch. Assuming that fluid pressure is not being applied to either one of the two passages, each of the surfaces 57 engage the surface formed by the end of the corresponding ring 32. The resilient O ring 27 is compressed between the surfaces 28 and 57, to provide a fluid tight seal.

Operation of the valve described above is as follows: For the open position of the gate shown in Figure 1, fluid flows freely through the ports 42. Under such conditions the pressure in the body space 11 may be equal to that of the line pressure. When the gate is in its closed position (i. e. the lowered dotted line position of Figure 1) the gate forms a closed obstruction or barrier between the parts 10b. Assuming that a differential fluid pressure is applied, whereby the pressure in the left hand passage 13 of Figure 1 is relatively high compared to the pressure in the right hand passage 13, such differential pressure when initially applied forces the left hand gate section 41 toward the right, and away from contact with the associated O ring. The separation is such that some fluid leakage may occur past the O ring into the body space 11. On the right hand or low pressure side of the valve, the gate section 41 is pressed against the corresponding end face of the ring 32, both by virtue of the pressure of the springs 43, and because of the thrust of the upstream fluid pressure. The seal ring 27 upon the low pressure side makes sealing engagement with the adjacent surface 57 of the gate, whereby a fluid tight seal is formed tending to prevent leakage past the gate and into the low pressure passage 13.

In the vent the direction of pressure application is reversed, whereby high pressure is applied to the right hand passage 13, the gate is compressed and forced against the left hand ring 32, whereas the left hand resilient O ring 27 forms a seal between the gate and the adjacent body part 10b.

Assuming again that fluid pressure is applied to the left hand passage 13, as the gate is moved from closed toward open position, the ports 42 are gradually brought into registry with the passages 13. During the first part of this movement (Figure 2A) the downstream gate section starts to retract from sealing engagement with the corresponding resilient O ring 27 (located on the low pressure side) and thus some initial flow occurs between the lower portion of the sleeve 32, and the adjacent surface 57 of the gate. The fact that the bottom corner 30 of the groove 26 is in communication with the downflow passage 13, prevents this flow from dislodging the downstream O ring 27. As illustrated in Figure 2A, this is because the upstream pressure applied through the body space 11 presses upon the downstream O ring to urge it into its groove, rather than to create forces acting upon the O ring to cause its dislodgement. As the gate moves further into the partially open position (Figure 2B), a greater flow is established through the body space.

In the event the application of differential pressure is reversed either during or before one attempts to move the gate from closed toward open position, the action described above occurs with respect to the left hand O ring 27. In other words this O ring is held within its groove by pressure acting upon the same, and the sections of the gate are compressed, whereby line pressure applied to the inlet passage is applied directly to the body space 11. In other words, under such conditions the left hand resilient O ring 27 of Figure 1 serves to form an effective seal.

As explained above, the effective fluid seal is always formed on the downstream or outflow side of the gate, and this is accomplished by movement of the upstream gate section from contact with the upstream O ring. By this arrangement it is possible to prevent fluid flow from dislodging either O ring.

It will be evident from the foregoing that I have provided a valve having a number of desirable features. The fact that the body is made of a number of parts makes for ease of manufacture and assembly, and also facilitates servicing and field repairs. The valve has the advantage of bubble type tight seal obtained by the use of resilient O rings, but the O rings are held in place and are not dislodged by a fluid pressure or flow. Consequently the valve is capable of operating upon relatively high differential fluid pressures, as for example pressures of the order of 1000 p. s. i. or more. As previously explained, an inherent characteristic of the valve is that it is always the downstream resilient O ring which establishes a seal between the gate and the adjacent body part 10b, and the valve is adapted for reversible operation, that is it can be operated with pressure applied to either one of the two pipe connections provided.

It will be evident that while I desire the two-way feature referred to above, it is possible to eliminate the O ring from one side of the gate valve, and to provide for a seal between only one side of the gate and the adjacent body part 10b. With such a construction it is necessary to install and operate the valve for one-way application of fluid pressure, namely to that side of the valve which is remote from the O ring 27, whereby the gate is urged against the O ring to maintain a seal.

Previous reference has been made to the fact that the surfaces 29 and 31 are preferably curved or arcuate in section. This construction aids in maintaining the O ring within the groove 26, and in addition it minimizes the area of sealing contact between the O ring and the cooperating surface 57. Such an arrangement minimizes sliding friction between the O ring and the surface 57, and in addition reduces wear upon the O ring.

Figure 3 shows a simplified construction in which the gate is shortened, and is not provided with the plan ports 42. Also in this instance the body is not made with separate parts forming the flow passages. Thus with the construction of Figure 3, the body 71 is provided with the flow passages 72, and with the body space 73 for accommodating the gate 74. Also the body is provided with integral annular portions 76, on opposite sides of the gate, which form surfaces 77 for engaging the side surfaces 78 of the gate sections 79. The two gate sections 79 are spring pressed apart by the compression springs 80. The annular portions 76 are formed to provide the grooves 81 for accommodating the resilient O rings 82. The grooves are formed in part by the metal sleeves 83, which are fitted within the body portions 76, and which are held in place by suitable means such as the metal snap-in rings 84.

The two sections of the gate are loosely secured by a pin 86 to the operating stem 87. This stem extends slidably through the bonnet 88, and is sealed with respect to the bonnet, as for example by the use of O rings, the same as described for Figure 1.

The valve of Figure 3 operates in substantially the same manner as the valve of Figure 1. For open position of the valve the gate is retracted as shown in Figure 3. When the valve is closed the gate is moved downwardly until it forms a complete barrier between the passages 72, with the downstream surface 74 of the gate in sealing engagement with the associated downstream O ring 82.

Figure 4 illustrates another embodiment in which the parts associated with the main O rings are carried by an assembly which can be inserted and removed as a unit from the valve body. Thus in this instance the valve body 91 is provided with the flow passages 92 and 93. The space 94 within the body is occupied by the insert unit 96, which includes the gate 97.

The assembly 96 also includes the head 98, which is fitted within the body, and is held in place by the split or segmented metal lock ring 99. Suitable means such as the resilient O ring 101 forms a seal between the head 98 and the body. A nut 102 can be threaded upon the head to hold the head in fixed relation with respect to the body. Members 103 are carried by the head, and are interposed between the gate and the opposed surfaces 104 formed on the annular portions 106 of the body.

Members 103 are sealed with respect to the body by suitable means such as the resilient O rings 107. The members 103 also carry the metal sleeves 108, which correspond to the sleeves 32 of Figures 1 and 2. These sleeves 108 can be held in place by suitable means such as the snap-in rings 109. Members 103, together with the sleeves 108, provide the annular grooves 111 for accommodating the resilient O rings 112. The O rings establish sealing relation with the two sections 113 of the gate 97, the same as in Figure 1.

One or more compression springs 114 serve to urge the gate sections 113 apart, and the gate may be guided by the studs 116. To prevent lateral displacement of the gate, members 103 can be made as side walls of a box-like section, and the other two walls of this section may be provided with guide studs 117.

The upper portions of the gate sections are loosely attached to the nut 118, which has threaded engagement with the rotatable stem 119. A thrust bearing assembly 121 can be mounted upon the head 98 for journaling the stem 119, and suitable means is provided for sealing the stem, as for example the resilient O ring 122.

Operation of the embodiment illustrated in Figures 4, 5 and 6 is the same as for Figures 1 and 2. One or the other of the resilient O rings 112 establishes a seal between the gate and the body, and the particular O ring which is effective is that one which is on the low pressure or downstream side of the gate. The advantage of the arrangement shown in Figure 4 is that the entire unit 96 can be removed for making repairs or replacements.

Figures 7 and 8 illustrate a valve of the plug type incorporating the invention. The body 126 is formed to provide aligned flow passages 127, and the space 128 within the body is occupied by the spherical or ball-shaped plug 129. The ball is formed in two parts or sections 129a and 129b, which in cross section can be shaped as shown in Figure 8. Aligned ports 131a and 131b are formed in the two sections, and are in registry with the passages 127 for open position of the valve. The two plug sections are urged apart in a direction parallel to the axis of the aligned ports 131a and 131b, by the compression springs 132. In addition the two sections are urged apart in a direction at right angles to the axis of the ports 131a and 131b, by the compression springs 133.

The body is provided with annular portions 134 which generally surround the passages 127, and which have concave spherical shaped end faces adapted to engage the adjacent spherical surfaces of the plug 129. Each portion 134 is formed to provide an annular recess or groove 136, which serves to accommodate a resilient seal ring 137 of the O ring type.

The inner defining surface of each groove 136 is formed by a sleeve 138, which is removably held in place by the snap-in ring 139.

The ball section 129b is provided with a square or non-circular recess 141, which loosely accommodates the squared end 142 of the operating stem 143. The operating stem passes through a suitable gland fitting 144 to prevent leakage between the stem and the body.

In addition to engagement between the plug and the body portions 134, it is desirable to provide the body with lugs 146 (Figure 8) which engage the sides of the plug and which are on a line of centers which is at right angles to the axis of the portions 134.

It will be evident that upon turning the stem 143, the plug can be turned through 90° between open and closed positions. As viewed in Figure 8, the plug is turned counterclockwise 90° to closed position. The manner in which the plug is divided into sections provides an uninterrupted (except for the ports 131a and 131b) valve working surface for engaging the O rings 137 as the plug is turned between open and closed positions.

In general the plug valve shown in Figures 7 and 8 operates the same as the gate valves previously described. Assuming closed position of the plug, without application of fluid pressure the two sections of the plug are expanded by the compression springs 133 to press the valve working surface of the plug against the faces of the body portions 134, and to establish contact with the resilient O rings. When fluid pressure is applied to one of the flow passages 127, as for example to the left hand passage of Figures 7 and 8, the two sections of the plug are compressed against each other toward the right, thus permitting pressure to be transmitted past the left hand O ring, and causing the plug to be pressed against the right hand annular body portion 134. The right hand or downstream O ring 137 establishes sealed relation between the body and the plug, thus preventing leakage into the outflow passage.

While the plug valve of Figures 7 and 8 makes use of a spherical valve working surface it will be evident that I can employ a plug which is cylindrical or conical in shape, provided the faces of portions 134 be shaped accordingly.

I claim:

1. In a valve construction, a valve body having inflow and outflow passages, the body being formed to provide portions forming opposed annular valve working surfaces generally embracing said passages, a valve member disposed in the valve body and having portions forming valve working surfaces normally in proximity with the valve working surfaces of the body, said valve member being movable between open and closed positions relative to the passages and when in closed position being disposed as a barrier between said passages, said valve member being formed in at least two sections, means for loosely retaining said sections together whereby said sections have limited freedom of movement toward and away from each other, said sections also having limited freedom of movement relative to the body, spring means for normally urging said sections apart and against the valve working surfaces of the body, and means for forming fluid tight seals between the valve member and the body on the areas of proximity between said surfaces, said last means including seal rings of the resilient O-ring type, said body portions being formed to provide annular recesses for accommodating said seal rings, and means for loosely retaining the seal rings in said recesses, compression of said valve member portions toward each other under fluid pressure applied in one direction serving to permit clearance for fluid leakage past the seal ring located on the upstream side of the valve member and serving to compress the seal ring on the downstream side to form a fluid tight seal.

2. A valve as in claim 1 in which the valve member is in the form of a movable gate.

3. A valve member as in claim 1 in which the valve member is in the form of a rotatable plug.

4. In a valve construction, a valve body having aligned inflow and outflow passages, the body being formed to provide spaced portions forming opposed annular valve working surfaces generally embracing said passages, a valve gate disposed in the body and having parallel side surfaces forming valve working surfaces normally in proximity with the valve working surfaces of the body, an operating stem extending into the body and movable in opposite directions, said gate being formed in two separate sections ported on a plane intermediate the valve working surfaces of the body, spring means serving to urge said sections apart and against the valve working surfaces of the body, means loosely attaching each of said gate sections to the operating stem, whereby said sections are free to have limited movement relative to each other and relative to the valve working surfaces of the body, a pair of seal rings of the resilient O-ring type disposed adjacent the valve working surfaces of the gate, and embracing said fluid passages, said portions of the body being formed to provide annular recesses for accommodating and retaining said resilient O-rings, the relative freedom of movement between said sections being such that compression of said sections toward each other under fluid pressure applied in one direction serving to permit clearance for leakage past the seal ring located on the upstream side of the valve member and serving to compress the seal ring on the downstream side to form a fluid tight seal.

References Cited in the file of this patent

UNITED STATES PATENTS

| | | |
|---|---|---|
| 1,298,173 | Cadman | Mar. 25, 1919 |
| 1,324,351 | Haynes | Dec. 9, 1919 |
| 1,437,426 | Kitts | Dec. 5, 1922 |
| 1,742,319 | Porter | Jan. 7, 1930 |
| 2,391,278 | Stark | Dec. 18, 1945 |
| 2,432,225 | Carbon | Dec. 9, 1947 |
| 2,496,452 | Eichenberg | Feb. 7, 1950 |
| 2,570,413 | Volpin | Oct. 9, 1951 |
| 2,606,740 | Allen | Aug. 12, 1952 |
| 2,621,885 | Schmitt | Dec. 16, 1952 |
| 2,674,436 | Jones | Apr. 6, 1954 |